US012631132B2

(12) United States Patent
Cho et al.

(10) Patent No.: US 12,631,132 B2
(45) Date of Patent: May 19, 2026

(54) LNG COLD POWER GENERATION USING MIXED WORKING FLUID

(71) Applicant: SK GAS CO., LTD., Seongnam-si (KR)

(72) Inventors: Jungho Cho, Seongnam-si (KR); Ung Gi Hong, Seongnam-si (KR); Mi Young Lee, Seongnam-si (KR)

(73) Assignee: SK GAS CO., LTD., Seongnam-si (KR)

( * ) Notice: Subject to any disclaimer, the term of this patent is extended or adjusted under 35 U.S.C. 154(b) by 24 days.

(21) Appl. No.: 18/698,658

(22) PCT Filed: Sep. 23, 2022

(86) PCT No.: PCT/KR2022/014265
§ 371 (c)(1),
(2) Date: Apr. 4, 2024

(87) PCT Pub. No.: WO2023/063618
PCT Pub. Date: Apr. 20, 2023

(65) Prior Publication Data

US 2024/0401504 A1 Dec. 5, 2024

(30) Foreign Application Priority Data

Oct. 13, 2021 (KR) ........................ 10-2021-0136036

(51) Int. Cl.
*F01K 27/00* (2006.01)
*F01K 25/10* (2006.01)

(52) U.S. Cl.
CPC ............ *F01K 27/00* (2013.01); *F01K 25/103* (2013.01); *F05D 2210/13* (2013.01); *F05D 2260/10* (2013.01)

(58) Field of Classification Search
CPC .... F01K 27/00; F01K 25/103; F05D 2210/13; F05D 2260/10
See application file for complete search history.

(56) References Cited

U.S. PATENT DOCUMENTS 11,293,309 B2 * 4/2022 Bowan ...................... F01D 3/04
2017/0130614 A1 * 5/2017 Held ....................... F01K 25/04
(Continued)

FOREIGN PATENT DOCUMENTS

JP 2001-019944 A 1/2001
JP 2008-506883 A 3/2008
(Continued)

OTHER PUBLICATIONS

International Search Report for PCT/KR2022/014265 mailed Jan. 13, 2023 from Korean Intellectual Property Office.
(Continued)

*Primary Examiner* — Hoang M Nguyen
(74) *Attorney, Agent, or Firm* — Paratus Law Group, PLLC

(57) ABSTRACT

LNG cold power generator includes: a working fluid including carbon dioxide and ethane; a pump; an evaporator; a turbine; and a condenser. A molar ratio of the carbon dioxide and the ethane is 85~95:15:0.5. The working fluid is used in a closed Rankine cycle. A supply pressure of supplied LNG is adjusted to a pressure at which it becomes a saturated liquid. A temperature at an outlet of the condenser is adjusted to a saturated vapor temperature of LNG. A pressure at an outlet of the pump is adjusted to a critical pressure of a mixed working fluid. The cycle includes two turbines and a heater provided therebetween. The heater heats the working fluid to prevent condensation thereof.

2 Claims, 5 Drawing Sheets

(56) References Cited

U.S. PATENT DOCUMENTS

| | | | | |
|---|---|---|---|---|
| 2018/0340450 | A1* | 11/2018 | Avadhanula .......... | F01K 25/103 |
| 2024/0003619 | A1* | 1/2024 | Amidei .................. | F25J 1/0035 |

FOREIGN PATENT DOCUMENTS

| | | | |
|---|---|---|---|
| JP | 2017-075594 | A | 4/2017 |
| JP | 2018-128201 | A | 8/2018 |
| JP | 2020-118441 | A | 8/2020 |
| KR | 10-1559251 | B1 | 10/2015 |
| KR | 10-2019-0081313 | A | 7/2019 |
| KR | 10-2020-0144805 | A | 12/2020 |

OTHER PUBLICATIONS

Korean Office Action for related KR Application No. 10-2021-0136036 mailed Dec. 23, 2022 from Korean Intellectual Property Office.

Korean Notification of Rejection for related KR Application No. 10-2021-0136036 mailed May 16, 2023 from Korean Intellectual Property Office.

* cited by examiner

LNG COLD POWER GENERATION USING MIXED WORKING FLUID

CROSS-REFERENCE TO PRIOR APPLICATIONS

This Application is a National Stage Patent Application of PCT International Application No. PCT/KR2022/014265 (filed on Sep. 23, 2022), which claims priority to Korean Patent Application No. 10-2021-0136036 (filed on Oct. 13, 2021), which are all hereby incorporated by reference in their entirety.

BACKGROUND

The present disclosure relates to LNG cold power generation using a mixed working fluid.

Korea imports more than 40 million tons of liquefied natural gas (hereinafter referred to as LNG) annually, making it the third-largest importing country in the world after Japan and China. In terms of individual receiving terminals, the scale of Korea Gas Corporation's Pyeongtaek and Incheon terminals ranks as the largest and second-largest in the world. Korea, Japan, and China import natural gas by liquefying it at −163° C. or lower under conditions near normal pressure.

The reason for liquefying natural gas is because the volume of LNG decreases to about 1/600 compared to normal temperature and pressure conditions, making it easy to store and transport. However, in order to liquefy natural gas at temperature below −163° C., a refrigerator and electrical energy for operating the refrigerator are required. Although it varies depending on a liquefaction process, Table 1 below provides the comparison of power required to liquefy 1 kg/h of LNG for each liquefaction process.

TABLE 1

| No. | Refrigeration Cycle | Power required to liquefy LNG 1 kg/h |
|---|---|---|
| 1 | SMR | 0.656 kW |
| 2 | Cascade | 0.770 kW |
| 3 | Multi-stage Cascade | 0.430 kW |
| 4 | C3-MR | 0.299 kW |
| 5 | KS-MR | 0.300 kW |

While liquefied natural gas evaporates into gaseous natural gas and undergoes a phase change, approximately 200 kcal of heat is required per 1 kg of natural gas. Japan uses 60% of the imported LNG as cold heat, while China uses more than 10% of the imported LNG as cold heat. However, in the case of Korea, the majority of LNG is evaporated through heat exchange with seawater, so the cold heat of LNG is hardly used and is released into the sea. Low-temperature energy of −163° C. is distinguished from high-temperature energy and is called cold heat.

If low-pressure LNG is vaporized through seawater, power may not be obtained. LNG cold power generation refers to obtaining a significant amount of power through a turbine by pressurizing LNG through a pump and then vaporizing it through heat exchange with seawater to obtain high-pressure natural gas. At this time, power consumed by liquid pumping is relatively small compared to power obtained from high-pressure natural gas through the turbine.

SUMMARY

The present disclosure is intended to provide a mixed working fluid that can improve the effect of conventional LNG cold power generation.

The present disclosure provides LNG cold power generation including a working fluid comprising carbon dioxide and ethane, a pump, an evaporator, a turbine, and a condenser.

A molar ratio of the carbon dioxide and the ethane may be 85~95:15~0.5.

The working fluid may be used in a closed Rankine cycle.

A supply pressure of supplied LNG may be adjusted to a pressure at which it becomes a saturated liquid.

A temperature at a condenser outlet may be adjusted to a saturated vapor temperature of LNG.

A pressure at the pump outlet may be adjusted to a critical pressure of a mixed working fluid.

The cycle may include two turbines and a heater provided therebetween.

The heater may heat the working fluid to prevent condensation thereof.

Either or both of the evaporator and the heater may utilize waste heat in a process.

According to the present disclosure, when LNG cold power generation is performed using a mixed working fluid, waste heat within a process can be used, and natural gas consumption can be significantly reduced compared to a conventional power generation process.

DETAILED DESCRIPTION

Figure 1:
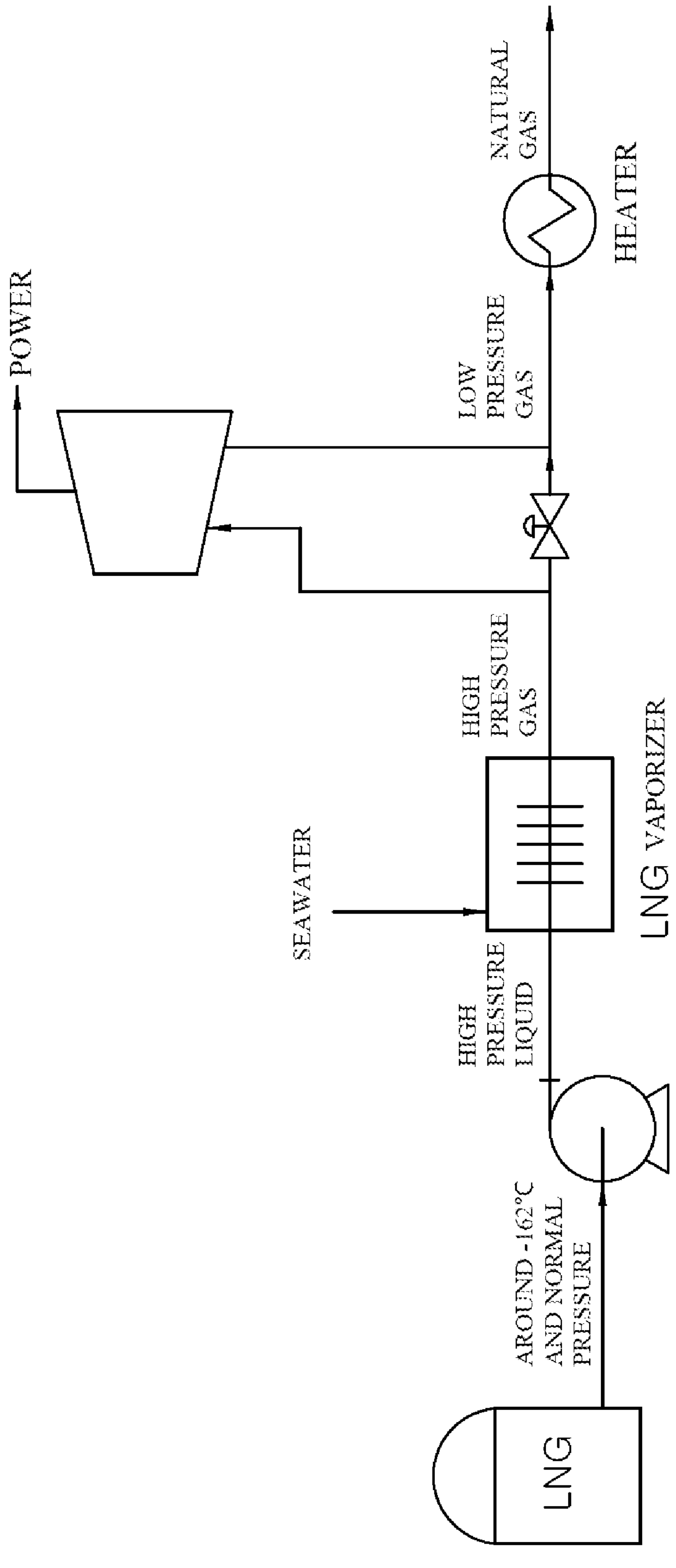
FIG. 1 schematically illustrates an open Rankine cycle.

The present disclosure provides LNG cold power generation including a working fluid comprising carbon dioxide and ethane, a pump, an evaporator, a turbine, and a condenser.

Hereinafter, preferred embodiments of the present disclosure will be described with reference to the accompanying drawings.

When describing the embodiments, it should be noted that the same reference numerals are used throughout the drawings to designate the same or similar components. When it is determined that the detailed description of the known art related to the present disclosure may obscure the gist of the present disclosure, the detailed description will be omitted. In the drawings, components will not be shown to scale.

It will be understood that, although the terms “first”, “second”, “A”, “B”, “(a)”, “(b)”, etc. may be used herein to describe various components, these components should not be limited by these terms. These terms are only used to distinguish one component from another component.

It will be understood that when a component is referred to as being “coupled” or “connected” to another component, it can be directly coupled or connected to the other component or intervening components may be present therebetween.

Furthermore, when a first component such as a layer, a film, a region, or a plate is disposed “above” or “on” a second component, the first component may be not only "directly above" the second component but a third component may be interposed between them. To the contrary, when a first component is "directly above" a second component, no component may be present between them.

FIG. 1 shows a conceptual diagram of the simplest open Rankine cycle for LNG cold power generation using a working fluid.

Referring to FIG. 1, LNG, which is at a pressure condition slightly higher than normal pressure around −162° C., becomes high-pressure LNG after being pressurized by a pump. Thereafter, when heat exchange is performed by seawater, LNG evaporates and changes a phase into high-pressure natural gas. Power may be produced by operating a turbine using the high-pressure natural gas.

Tokyo Gas Co. produced about 290 kW of power using 10 ton/h of LNG.

Since the exact components of LNG are not known, typical gas components were used among LNG components imported into Korea Gas Corporation, as shown in Table 2.

TABLE 2

| Component | Mole % |
|---|---|
| Nitrogen | 0.04 |
| Methane | 89.26 |
| Ethane | 8.64 |
| Propane | 1.44 |
| I-butane | 0.27 |
| N-butane | 0.35 |
| MW (kg/k-mole) | 17.924 |
| GHV (kcal/Sm$^3$) | 10,450 |

Figure 2:
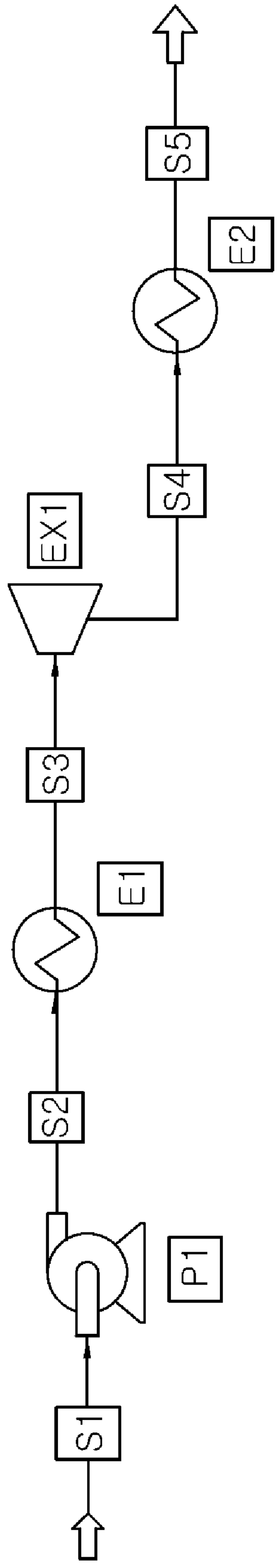
FIG. 2 schematically illustrates a power production flowsheet of the open Rankine cycle using PRO/II with PROVISION.

As a result of performing a computer simulation using LNG and using PRO/II with PROVISION V10.2 from AVEVA Group Limited, as shown in FIG. 2, computer simulation results shown in Table 3 below were obtained. The net power obtained through Table 3 below was 300 kW, which was higher than 290 kW obtained from Tokyo Gas Co.

TABLE 3

| | | | | |
|---|---|---|---|---|
| Feed | CH4 | −162° C. | 1.5 atm | 10,000 kg/h |
| P1Pump | outlet pressure: 50 atm | pump efficiency: 56% | power required: 44 kW | — |
| E1 heat exchanger | outlet temperature: 1° C. | 1.8935 × 10$^6$ kcal/h | — | — |
| Ex1 turbo expander | outlet pressure: 12 atm | efficiency: 75% | power gained: 344 kW | net power: 300 kW |
| E2 heat exchanger | outlet temperature: 25° C. | 0.5483 × 10$^6$ kcal/h | | |

Figure 3:
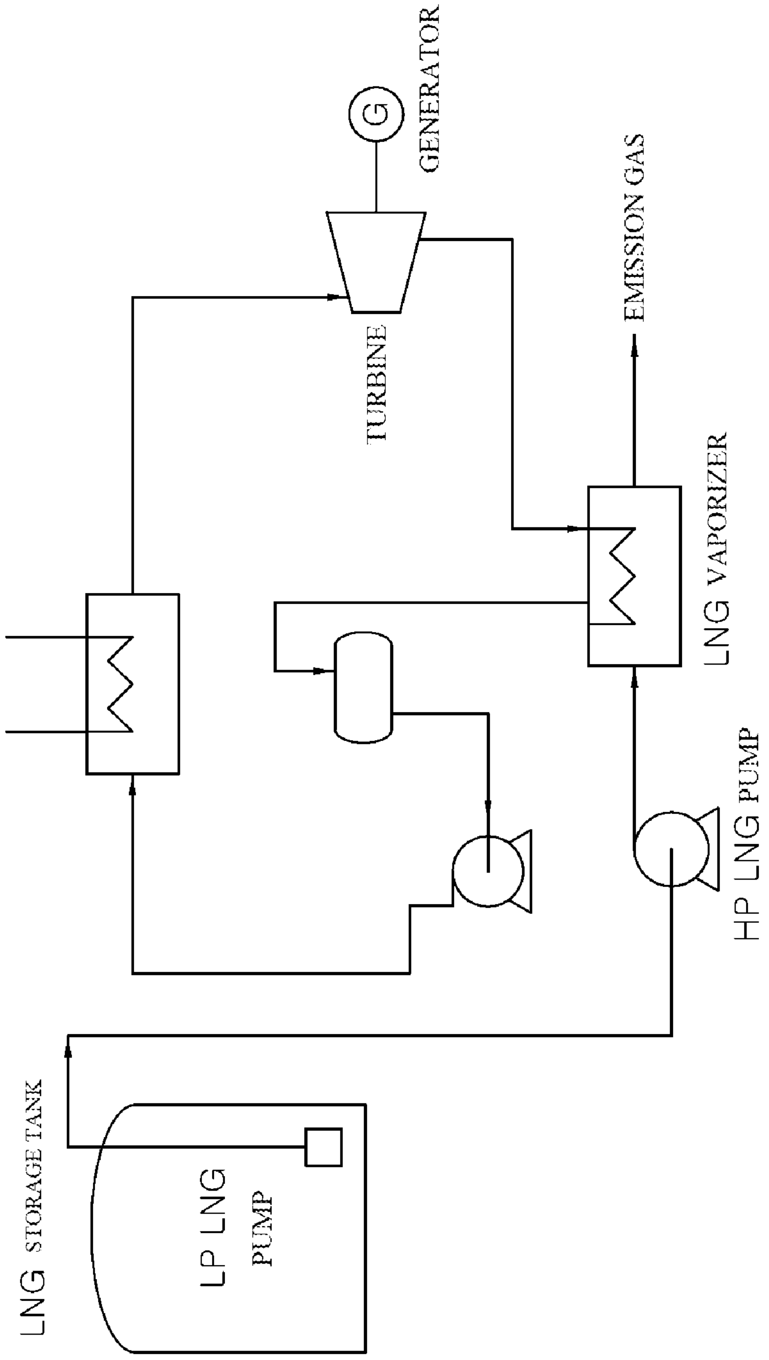
FIG. 3 schematically illustrates a closed Rankine cycle.

FIG. 3 illustrates a schematic view of a closed Rankine cycle. Since the advantage of the closed Rankine cycle of FIG. 3 is that the pressure of evaporated natural gas can be maintained at high pressure compared to the open Rankine cycle, it is possible to additionally generate power through the turbine.

Tokyo Gas Co. achieved the power generation effect of 442 kW by using 10 ton/h of LNG cold heat through LNG cold power generation using propane as the working fluid in the closed Rankine cycle as shown in FIG. 3.

Figure 4:
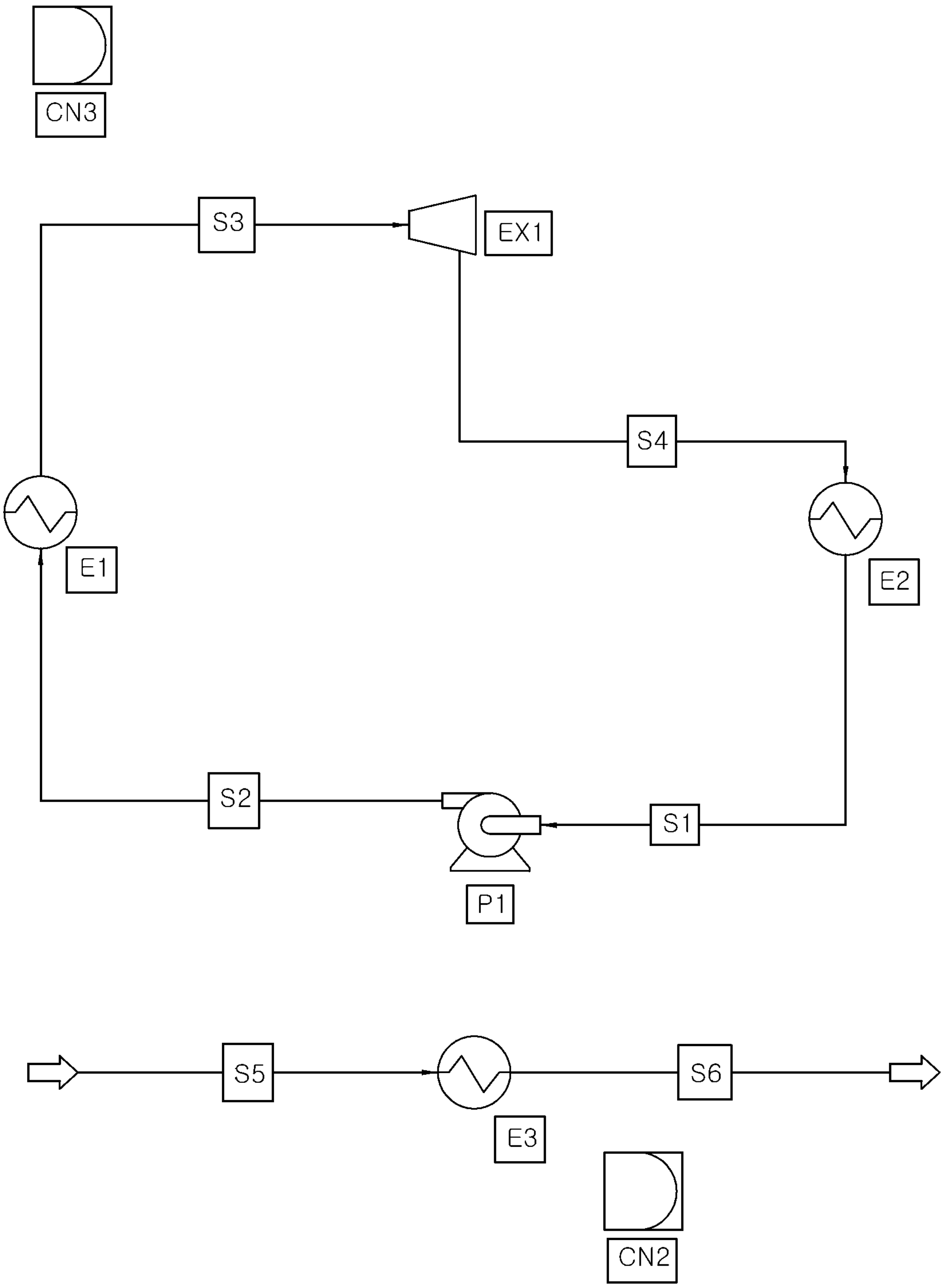
FIG. 4 schematically illustrates a flowsheet of the closed Rankine cycle for LNG cold power generation using PRO/II with PROVISION.

FIG. 4 illustrates a flowsheet implementing the closed Rankine cycle using PRO/II with PROVISION.

Table 4 below summarizes the computer simulation results using PRO/II with PROVISION in FIG. 4.

TABLE 4

| Item | Result | Unit |
|---|---|---|
| LNG mass flow rate | 10,000 | kg/h |
| Turbine power | 374.69 | kW |
| Turbine efficiency | 85 | % |
| Propane circulation flow rate | 7,874 | kg/h |
| Pump power required | 17.01 | kW |
| Pump efficiency | 805 | % |
| Working fluid condenser duty | 0.8970 × 10$^6$ | kcal/h |
| Working fluid evaporator duty | 1.2046 × 10$^6$ | kcal/h |
| Pump outlet pressure | 40 | bar |
| Turbine outlet pressure | 0.696 | bar |
| Working fluid evaporator outlet temperature | −50 | ° C. |
| Working fluid condenser outlet temperature | 120 | ° C. |
| LNG evaporator outlet temperature | −53 | ° C. |

According to Table 4, the net power obtained from cold heat of 1 ton/h of LNG is 35.768 kW. Moreover, since the temperature at the outlet of the working fluid evaporator is 120° C., the working fluid should be evaporated using steam. To obtain steam, the combustion of natural gas is required. In Table 2 above, the molecular weight of LNG is 17.924 kg/k-mole and GHV is 10,450 kcal/Sm$^3$, the mass flow rate of LNG required to supply heat equivalent to 1.2046×106 kcal/h, which is the heat duty of the working fluid evaporator, is 92.24 kg/h. This means that 92.24 kg/h of natural gas is consumed per hour to generate LNG cold power using propane as the working fluid.

The selection conditions for the working fluid for application to the closed Rankine cycle using the LNG cold heat according to the present disclosure are as follows.

First, a working fluid that may operate at a high pressure at the outlet of the pump is preferred. This is related to the critical pressure of the working fluid. The pressure at the outlet of the pump is generally pressurized close to the critical pressure.

Second, the lower temperature at the outlet of the working fluid condenser, achieved through heat exchange with LNG, the more advantageous it is. This is because the pressure at the outlet of an expansion valve may be lowered and an expansion ratio in the turbine may be increased, thereby obtaining more power. The temperature at the outlet of the working fluid condenser is related to the freezing point of the working fluid. Because the outlet of the working fluid condenser is directly connected to the pump, there is a restriction that the temperature should be maintained above the freezing point of the working fluid.

Third, the lower temperature at the outlet of the working fluid evaporator, the more advantageous it is. In the case of FIG. 4, when propane is used as the working fluid, the temperature at the outlet of the evaporator is 120° C. In this case, because low pressure (LP) steam should be used to evaporate the working fluid, consumption of the natural gas due to combustion occurs.

In order to select a working fluid that satisfies the above conditions, Table 5 below summarizes some basic physical properties for several working fluid candidates.

TABLE 5

| Item | $CO_2$ | $C_2H_6$ | $C_2H_4$ |
|---|---|---|---|
| Critical pressure (bar) | 73.83 | 48.72 | 50.40 |
| Freezing point (° C.) | −56.57 | −182.8 | −169.15 |
| Critical temperature (° C.) | 31.06 | 32.17 | 9.19 |

Among the working fluid candidates shown in Table 5 above, carbon dioxide is advantageous because it has the highest value at 73.83 bar in terms of the critical pressure. In terms of the freezing point, an ethane component is advantageous because it has the lowest value at −182.8° C. However, in this case, because it is lower than the supply temperature of LNG, there is a disadvantage that the cold heat of LNG due to the complete evaporation of LNG may not be fully utilized. Finally, the lower critical temperature of the working fluid when being pressurized close to critical pressure by the pump and then fully evaporated in the working fluid evaporator, the more advantageous it is. In this case, ethylene is the most advantageous because the critical temperature of ethylene is as low as 9.19° C.

Table 6 below shows the components, temperature and pressure conditions of LNG used in the present disclosure.

TABLE 6

| Component | Mole % |
|---|---|
| Nitrogen | 0.21 |
| Methane | 91.33 |
| Ethane | 5.36 |
| Propane | 2.14 |
| I-butane | 0.46 |
| N-butane | 0.48 |
| I-pentane | 0.02 |
| Total (%) | 100.000 |
| Temperature (° C.) | −130 |
| Pressure (MPaG) | 7.00 |
| Flow rate (Ton/h) | 180 |

In order to completely utilize the latent heat of LNG, the supply pressure of LNG is lowered to 0.605 MpaG where it becomes a saturated liquid. Under these conditions, the temperature at which all LNG evaporates is found to be −54.125° C. To completely utilize the cold heat of LNG and ensure that the temperature of the mixed working fluid at the outlet of the condenser differs by only 3° C. from the temperature after the LNG evaporates, the composition of carbon dioxide and ethylene to achieve −51.125° C. is preferably 10 mol % carbon dioxide and 90 mol % ethylene.

Figure 5:
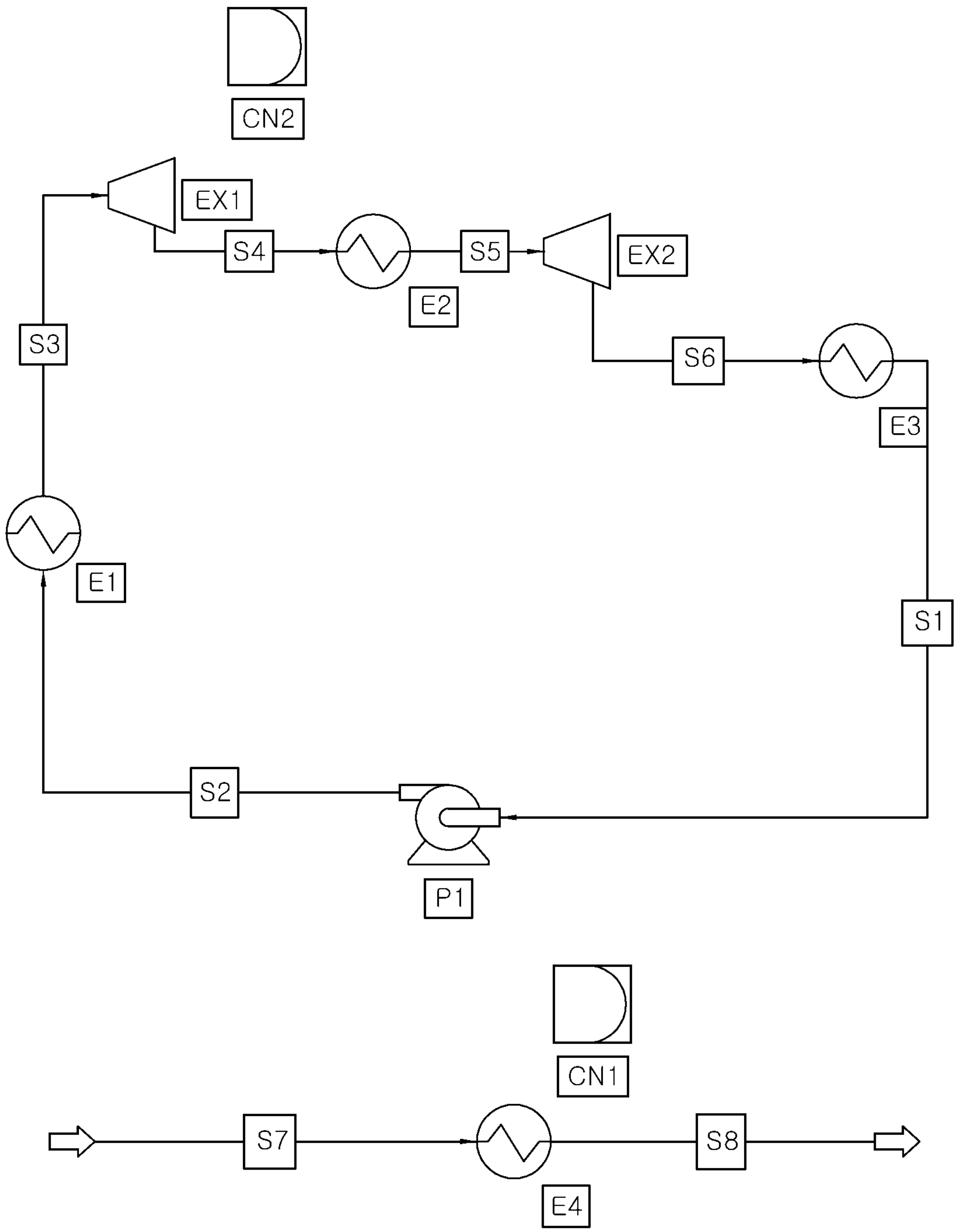
FIG. 5 schematically illustrates a flowsheet of the closed Rankine cycle for LNG cold power generation using a mixed working fluid according to the present disclosure.

In Table 5, a mixed working fluid containing 90 mol % carbon dioxide and 10 mol % ethane is used in a process shown in FIG. 5 to design the power production process using the LNG cold heat. Here, E3 is a mixed working fluid condenser, which exchanges heat with the LNG, so it is substantially the same heat exchanger as E4.

Table 7 below intensively shows some physical properties of carbon dioxide and ethane.

TABLE 7

| Component | $CO_2$ | $C_2H_6$ |
|---|---|---|
| Pc (bar) | 73.83 | 48.72 |
| Melting point (° C.) | −56.57 | −182.8 |
| Critical temperature (° C.) | 31.6 | 32.17 |
| Vapor pressure at −51.125° C. | 6.518 | 5.317 |

Table 8 below summarizes the computer simulation results in FIG. 5.

TABLE 8

| Item | Result | Unit |
|---|---|---|
| LNG mass flow rate | 631.81 | kg/h |
| Power of first turbine | 15.25 | kW |
| Efficiency of first turbine | 85 | % |
| Outlet pressure of first turbine | 16.918 | bar |
| Outlet temperature of first turbine | −22.538 | ° C. |
| Inlet temperature of first turbine | 69.215 | ° C. |
| Power of second turbine | 9.96 | kW |
| Efficiency of second turbine | 85 | % |
| Outlet pressure of second turbine | 8.627 | Bar |
| Outlet temperature of second turbine | 30.414 | ° C. |
| Inlet temperature of second turbine | 69 | ° C. |
| Working fluid evaporator outlet temperature | 69.215 | ° C. |
| Working fluid condenser outlet temperature | −51.125 | ° C. |
| Working fluid circulation flow rate | 1,000 | kg/h |
| Pump power required | 2.1030 | kW |
| Pump efficiency | 85 | % |
| Working fluid condenser duty | $0.0984 \times 10^6$ | kcal/h |
| Working fluid evaporator duty | $0.0930 \times 10^6$ | kcal/h |
| Pump outlet pressure | 47.67 | bar |

As shown in Table 8 above, in order to completely utilize the latent heat of LNG, the temperature at which LNG fully evaporates in an evaporator E4 to become saturated vapor is −54.125° C. Thus, the temperature of the working fluid at the outlet of a condenser E3 is set to −54.125° C. At this time, it is expanded at the outlet of a turbine EX1 or EX2 to reach a pressure at which it becomes saturated liquid. Since the expected melting point (or freezing point) of the mixed working fluid is about −69.193° C., there is a margin of about 15° C. The pressure at the outlet of a pump P1 is pressurized to 67.67 bar, which is 95% of the critical pressure of the mixed working fluid. The temperature at the outlet of a working fluid evaporator E1 and the outlet of a heater E2 between two turbines EX1 and EX2 is set to 69° C. This is determined as a minimum temperature necessary to prevent condensate from forming at the outlet of the first turbine EX1 in FIG. 5. If condensation occurs at the outlet of the first turbine EX1, the amount of power produced is reduced. Since the critical temperature of both components is around 30° C. and the pressure at the outlet of the pump P1 is set to 95% of the critical pressure of two mixed working fluids, the temperature at the outlet of the evaporator E1 may be lower than 30° C. when heated to a saturated vapor state.

According to Table 8, the net power obtained from cold heat of 1 ton/h of LNG is 36.573 kW. Although this is slightly higher than the net power of 35.768 kW obtained when propane is used as the working fluid, it can be seen that the temperature of working fluid at the outlet of the evaporator is 69.215° C. It can be seen that this is a temperature much lower than 120° C., which is the temperature of the propane working fluid at the outlet of the evaporator. It can be seen that this is a low temperature that is available through the utilization of waste heat in the process. Further, this process is advantageous in that it eliminates the need to consume 92.24 kg/h of natural gas, as compared to the power generation process that utilizes the LNG cold heat with propane as the working fluid.

Although the present disclosure has been described above with reference to preferred embodiments, it will understood by those skilled in the art that various modifications and changes may be made to the present disclosure without departing from the idea and scope of the present disclosure as set forth in the following claims.

Accordingly, embodiments disclosed herein are illustrative and not restrictive, and the scope of the present disclosure is not limited by these embodiments. The scope of protection of the present disclosure should be interpreted as defined in the appended claims, and all changes that fall within meets and bounds of the claims, or equivalence of such meets and bounds should be interpreted as being included in the scope of rights of the present disclosure.

The invention claimed is:

1. An LNG cold power generation system comprising:

a working fluid comprising carbon dioxide and ethane at a molar ratio of carbon dioxide:ethane of 85-95:15-0.5;

a pump;

an evaporator;

two turbines and a heater provided therebetween; and a condenser, wherein:

the LNG cold power generation system is configured to use the working fluid in a closed Rankine cycle, a supply pressure of supplied LNG is a pressure at which LNG becomes a saturated liquid, a temperature at an outlet of the condenser is a saturated vapor temperature of LNG, a pressure at an outlet of the pump is a critical pressure of the working fluid, the heater heats the working fluid in an amount sufficient to prevent condensation thereof, either or both of the evaporator and the heater utilize waste heat in a process, and a temperature at an outlet of the condenser is within 3° C. of the LNG's temperature when fully evaporated.

2. A method of generating LNG cold power comprising:

supplying a working fluid comprising carbon dioxide and ethane at a molar ratio of carbon dioxide: ethane of 85-95:15-0.5 to an LNG cold power generation system that comprises a pump, an evaporator, two turbines and a heater provided therebetween, and a condenser, using the working fluid in a closed Rankine cycle, supplying LNG at a pressure at which LNG becomes a saturated liquid, maintaining a temperature at an outlet of the condenser at a saturated vapor temperature of LNG, maintaining a pressure at an outlet of the pump at a critical pressure of the working fluid, using the heater to heat the working fluid in an amount sufficient to prevent condensation thereof, utilizing waste heat in either or both of the evaporator and the heater, and maintaining a temperature at an outlet of the condenser within 3° C. of the LNG's temperature when fully evaporated.

* * * * *